(12) United States Patent
Morooka et al.

(10) Patent No.: US 11,459,920 B2
(45) Date of Patent: Oct. 4, 2022

(54) BLOW-BY GAS DISCHARGE DEVICE

(71) Applicant: ISUZU MOTORS LIMITED, Tokyo (JP)

(72) Inventors: Tadashi Morooka, Fujisawa (JP); Yuuki Himuro, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/280,435

(22) PCT Filed: Sep. 24, 2019

(86) PCT No.: PCT/JP2019/037224
§ 371 (c)(1),
(2) Date: Mar. 26, 2021

(87) PCT Pub. No.: WO2020/066992
PCT Pub. Date: Apr. 2, 2020

(65) Prior Publication Data
US 2022/0003137 A1    Jan. 6, 2022

(30) Foreign Application Priority Data

Sep. 27, 2018   (JP) .............................. JP2018-182121

(51) Int. Cl.
*F01M 13/04*   (2006.01)
*B01D 45/06*   (2006.01)
(Continued)

(52) U.S. Cl.
CPC .............. *F01M 13/04* (2013.01); *B01D 45/06* (2013.01); *F01L 1/022* (2013.01); *F01M 11/02* (2013.01); *F01M 2013/0472* (2013.01)

(58) Field of Classification Search
CPC ................... F01M 13/04; F01M 11/02; F01M 2013/0472; B01D 45/06; F01L 1/022
See application file for complete search history.

(56) References Cited

U.S. PATENT DOCUMENTS

2009/0241921 A1   10/2009 Ito et al.
2011/0061635 A1*   3/2011 Bukhenik .............. F02M 25/06
                                                          123/573

(Continued)

FOREIGN PATENT DOCUMENTS

CN     101490372 A     7/2009
JP     S58044418 U     3/1983
(Continued)

OTHER PUBLICATIONS

International Search Report and Written Opinion for related PCT App No. PCT/JP2019/037224 dated Dec. 3, 2019, 9 pgs. (partial translation).

(Continued)

*Primary Examiner* — Syed O Hasan
(74) *Attorney, Agent, or Firm* — Procopio, Cory, Hargreaves & Savitch LLP

(57) ABSTRACT

This blow-by gas discharge device is provided with: blow-by gas piping 23 which is extended from the height position of the upper end of an internal combustion engine 1 to the height position of the lower end, is exposed to the outside air, and has an outlet 33 open to the atmosphere; and a heating chamber 24 which is provided between the ends of the blow-by gas piping, is formed in the flywheel housing 10 of the internal combustion engine, and heats blow-by gas.

3 Claims, 2 Drawing Sheets

(51) Int. Cl.
_F01L 1/02_  (2006.01)
_F01M 11/02_  (2006.01)

(56)  References Cited

U.S. PATENT DOCUMENTS

2018/0306075 A1* 10/2018 Osada .................... F01M 13/04
2021/0310386 A1* 10/2021 Himuro ................. F01M 13/00

FOREIGN PATENT DOCUMENTS

| JP | S58156112 U   | 9/1983 |
|----|---------------|--------|
| JP | UM-S62-000721 A | 1/1987 |
| JP | 01063713 U    | 3/1989 |
| JP | H01095513 U   | 4/1989 |
| JP | 2016183604    | * 10/2016 |

OTHER PUBLICATIONS

National Intellectual Property Administration of the People's Republic of China, The First Office Action, Application No. CN201980063609. 4, dated May 12, 2022, in 13 pages.

* cited by examiner

BLOW-BY GAS DISCHARGE DEVICE

CROSS-REFERENCE TO RELATED APPLICATIONS

This application is a U.S. National Stage entry of PCT Application No: PCT/JP2019/037224 filed on Sep. 24, 2019, which claims priority to Japanese Patent Application No. 2018-182121 filed Sep. 27, 2018, the contents of which are incorporated herein by reference.

TECHNICAL FIELD

The present disclosure relates to a blow-by gas discharge device, and more particularly, to a device for discharging blow-by gas into the atmosphere through a blow-by gas pipe exposed to the outside air.

BACKGROUND ART

In general, blow-by gas generated in the crankcase of an internal combustion engine is circulated into an air intake system, is sent into a combustion chamber, and is burned together with air-fuel mixture in the combustion chamber.

CITATION LIST

Patent Literature

Patent Literature 1: JP H01-95513 U

SUMMARY OF INVENTION

Technical Problem

Meanwhile, a device that discharges blow-by gas into the atmosphere instead of circulating it into an air intake system is also known (see Patent Literature 1 for instance). In this case, it can be considered to provide a blow-by gas pipe that is exposed to the outside air and that extends from a height position of an upper end part of the internal combustion engine to a height position of a lower end part of the internal combustion engine, and to discharge the blow-by gas into the atmosphere through the blow-by gas pipe.

However, in such a case, since the blow-by gas pipe is cooled by the outside air, the blow-by gas passing through the pipe is also cooled, so condensed water attributable to the blow-by gas is generated in the pipe. If the temperature of the outside air is equal to or lower than the freezing point, the condensed water may freeze and block the inside of the pipe.

The present disclosure provides a blow-by gas discharge device capable of preventing freezing of condensed water in a blow-by gas pipe.

Solution to Problem

According to an aspect of the present disclosure, a blow-by gas discharge device includes: a blow-by gas pipe that extends from a height position of an upper end part of an internal combustion engine to a height position of a lower end part of the internal combustion engine, the blow-by gas pipe being exposed to an outside air and having an outlet part released to an atmosphere; and a heat chamber provided in a middle of the blow-by gas pipe and in a flywheel housing of the internal combustion engine, the heat chamber being configured to heat blow-by gas.

The blow-by gas discharge device may further include an oil separator provided at the height position of the upper end part of the internal combustion engine and configured to separate oil from the blow-by gas, and the blow-by gas pipe may have an inlet part connected to the oil separator.

At least a part of the blow-by gas pipe may be formed of a metal.

The internal combustion engine may include: a power transmission mechanism configured to transmit power from a crankshaft to a camshaft; and a mechanism chamber that accommodates the power transmission mechanism, and the heat chamber may be adjacent to the mechanism chamber.

Advantageous Effects of Invention

According to the present disclosure, it is possible to prevent freezing of condensed water in a blow-by gas pipe.

DESCRIPTION OF EMBODIMENTS

Hereinafter, an embodiment of the present disclosure will be described with reference to the accompanying drawings. However, it is to be noted that the present disclosure is not limited to the following embodiment.

Figure 1:
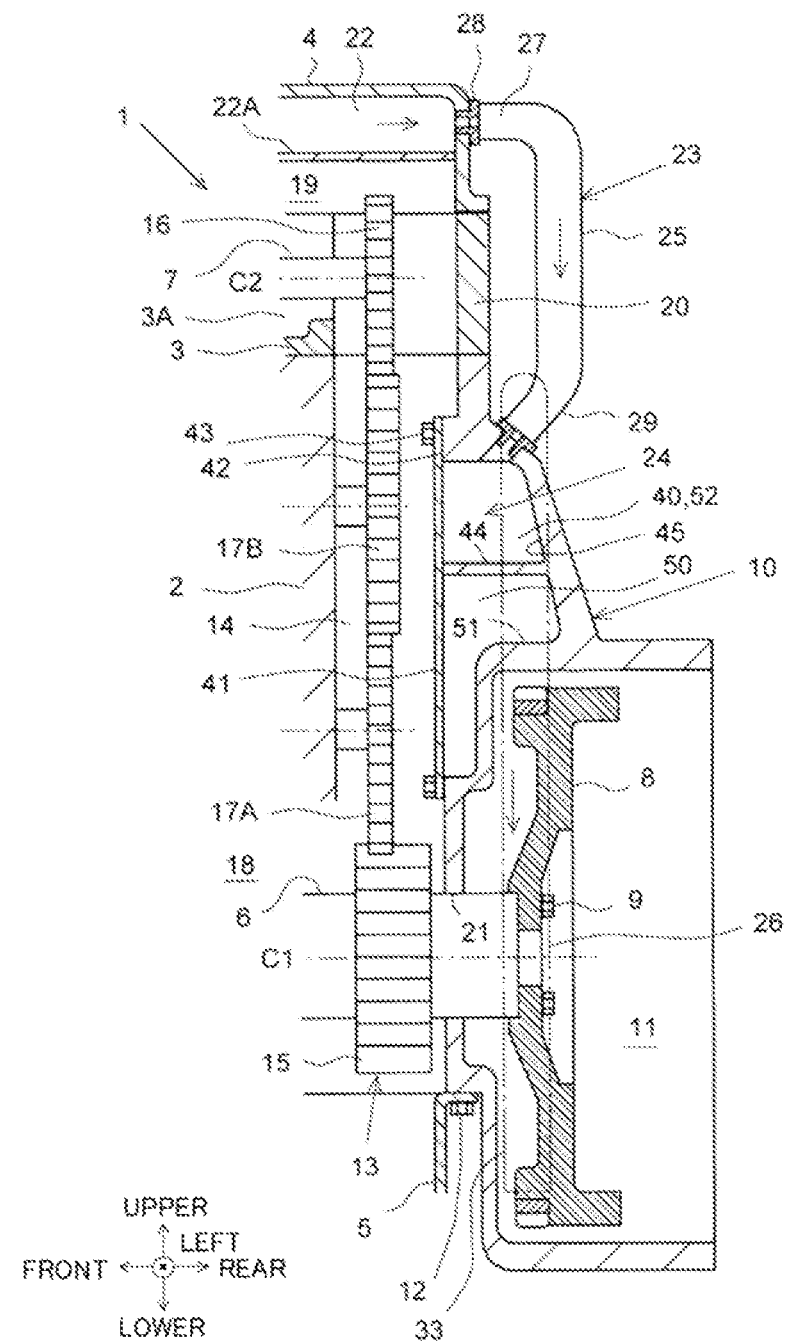
FIG. 1 is a cross-sectional side view illustrating a structure of an end part of an internal combustion engine.

FIG. 1 is a cross-sectional side view illustrating a structure of an end part of an internal combustion engine according to the present embodiment. An internal combustion engine (engine) 1 is a diesel engine mounted on a vehicle (not shown in the drawing), and the vehicle is a large vehicle such as a truck. However, the types, uses, and so on of the vehicle and the engine are not particularly limited, and the vehicle may be a small vehicle such as a car, and the engine may be a gasoline engine. The engine is mounted vertically on the vehicle. The front, rear, left, right, upper, and lower sides of the vehicle and the engine are as shown in the drawing.

The engine 1 includes a cylinder block 2 integrally including a crankcase (not shown in the drawing), a cylinder head 3 fastened to an upper end part of the cylinder block 2, a head cover 4 fastened to an upper end part of the cylinder head 3, and an oil pan 5 fastened to a lower end part of the crankcase. A crankshaft 6 is rotatably supported by the crankcase, and a camshaft 7 is rotatably supported by the cylinder head 3.

A flywheel 8 is attached to a rear end surface part of the crankshaft 6 by a plurality of bolts 9. A flywheel housing 10 that accommodates the flywheel 8 is attached to the cylinder block 2 by bolts or the like (not shown in the drawing). However, the flywheel housing 10 may be integrally formed in the cylinder block 2. In the flywheel housing 10, a cylindrical flywheel chamber 11 is provided, which accommodates the flywheel 8 such that the flywheel is substantially rotatable. A clutch device (not shown in the drawing) is connected to a rear end part of the flywheel housing 10, and a clutch input shaft of the clutch device is coaxially connected to the crankshaft 6. A part of the oil pan 5 is attached to the flywheel housing 10 by a bolt 12.

A mechanism chamber is provided between a rear end surface part of the cylinder block 2 and the flywheel housing 10. Inside the mechanism chamber, a power transmission mechanism that transmits power from the crankshaft 6 to the camshaft 7 is accommodated. In the present embodiment, the power transmission mechanism includes a gear mechanism 13 including a plurality of gears meshing with each other, and the mechanism chamber includes a gear chamber 14. However, the type of the power transmission mechanism is arbitrary, and for example, the power transmission mechanism may include a chain mechanism. The gear mechanism 13 includes a crank gear 15 fixed to the crankshaft 6, a cam gear 16 fixed to the camshaft 7, and a plurality of (in the present embodiment, two) intermediate gears 17A and 17B interposed between the crank gear 15 and the cam gear 16. The gear chamber 14 communicates with a crank chamber 18 in the crankcase, a valve chamber 3A of the cylinder head 3, and a cover chamber 19 of the head cover 4.

C1 and C2 represent a central axis of the crankshaft 6 and a central axis of the camshaft 7, respectively.

A rear end part of the cylinder head 3 is provided integrally with a gear chamber partition wall 20 having a half-rectangular frame shape (a shape like U letter) as seen in a plan view and protruding from the rear end part of the cylinder head 3. An inner space of the gear chamber partition wall 20 is a part of the gear chamber 14. An upper end surface of the flywheel housing 10 is brought into close contact with a lower end surface of the gear chamber partition wall 20, and a lower end surface of the head cover 4 is brought into close contact with an upper end surface of the gear chamber partition wall 20.

A rear end part of the crankshaft 6 protrudes into the flywheel chamber 11 located rearwardly through an insertion hole 21 of the flywheel housing 10. On a peripheral part of the insertion hole 21, a sealing member (not shown in the drawing) is provided, which prevents oil and gas from leaking from the gear chamber 14.

As is known, blow-by gas leaks from a combustion chamber of a cylinder into the crank chamber 18 though a gap between a piston ring and a cylinder bore. The blow-by gas is introduced into the cover chamber 19 through the gear chamber 14 and another gas passing hole.

In the cover chamber 19, an oil separator 22 is provided, which separates oil from blow-by gas. Although not shown in the drawing, the oil separator 22 has a meandering passage that allows blow-by gas to flow therethrough. In the present embodiment, blow-by gas from which oil has been separated by the oil separator 22 is discharged into the atmosphere through a gas pipe 23 serving as a blow-by gas pipe.

The gas pipe 23 is exposed to the outside air, and is cooled directly by the outside air. Especially, the gas pipe 23 of the present disclosure is formed of a metal such as stainless steel, and the entire gas pipe 23 is exposed to the outside air, so it is easily cooled by the outside air. As a result, blow-by gas passing through the gas pipe 23 is also cooled, and condensed water attributable to the blow-by gas is generated in the gas pipe 23. Therefore, for example, in a cold region or the like, when the temperature of the outside air is equal to or lower than the freezing point, the condensed water may freeze and block the inside of the gas pipe 23. If the inside of the gas pipe 23 is blocked, it may disrupt discharge of blow-by gas.

For this reason, in the present embodiment, a heat chamber 24 that heats blow-by gas is provided in the middle of the gas pipe 23. Blow-by gas is heated in the heat chamber 24, whereby generation of condensed water attributable to blow-by gas and freezing thereof are prevented. Especially, the heat chamber 24 is provided inside the flywheel housing 10, is adjacent to the gear chamber 14 with a partition (in the present embodiment, a lid 41 to be described below) interposed therebetween, and heats blow-by gas by heat received from oil in the gear chamber 14. Therefore, it is possible to efficiently heat blow-by gas without providing a dedicated heat source. Hereinafter, the configuration of the blow-by gas discharge device will be described in detail.

The whole of the gas pipe 23 extends from a height position of an upper end part of the engine 1 to a height position of a lower end part of the engine 1. However, the gas pipe 23 is divided into two parts at a position in the middle of the height direction. i.e. an upstream side gas pipe 25 and a downstream side gas pipe 26 (shown by an imaginary line (a dot-dashed line) in FIG. 1). The heat chamber 24 is connected between the upstream side gas pipe 25 and the downstream side gas pipe 26. Both of the upstream side gas pipe 25 and the downstream side gas pipe 26 are formed of a metal such as stainless steel, and are exposed to the outside air outside the engine.

An inlet part 27 of the upstream side gas pipe 25 is connected to the oil separator 22. In the head cover 4, an outlet port 28 is provided, which allows blow-by gas from which oil has been separated to outflow from the oil separator 22. The inlet part 27 of the upstream side gas pipe 25 is connected to the outlet port 28. The inlet part 27 of the upstream side gas pipe 25 is an inlet part of the gas pipe 23. Since the head cover 4 and the oil separator 22 are provided at the height position of the upper end part of the engine 1, and the inlet part 27 of the upstream side gas pipe 25 is connected to the oil separator 22, the gas pipe 23 extends downstream from the height position of the upper end part of the engine 1.

The oil separator 22 may not be provided inside the head cover 4, but may be provided outside the head cover 4. The reference symbol "22A" in the drawing represents a partition wall that defines the oil separator 22.

Figure 2:
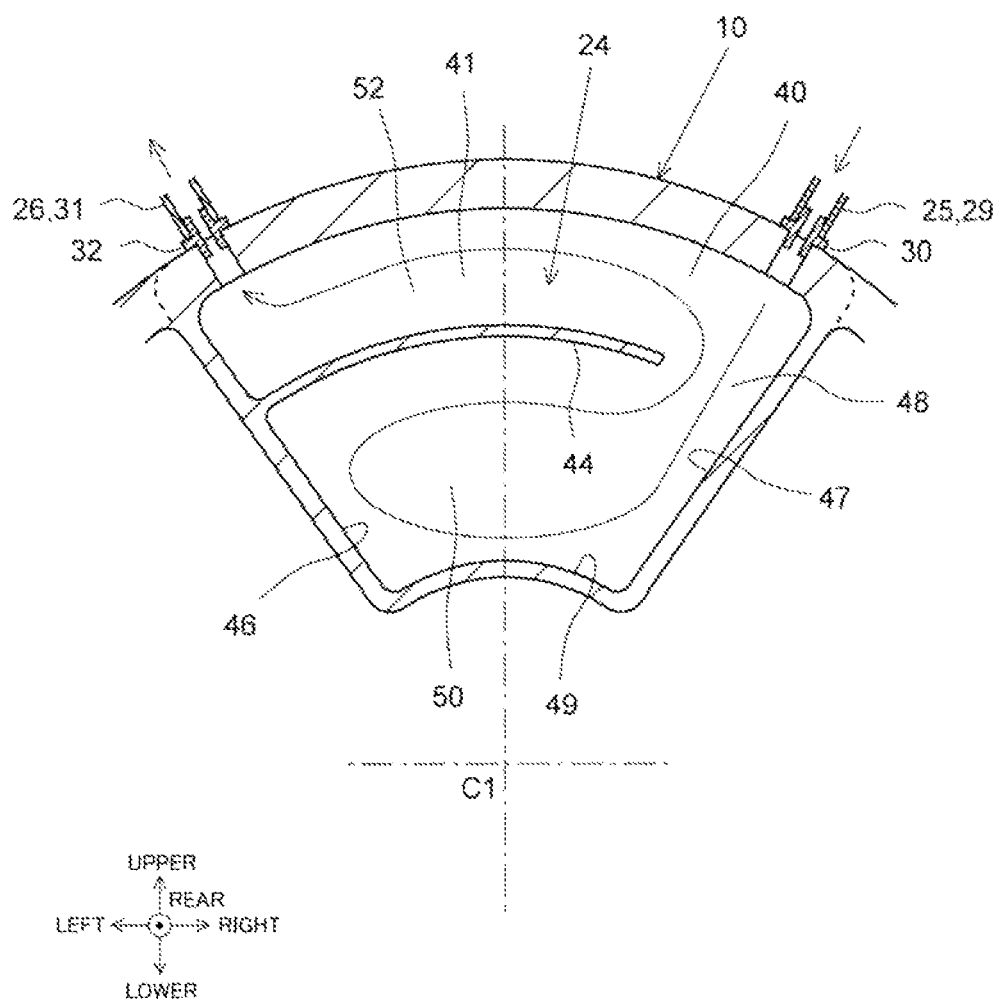
FIG. 2 is a schematic cross-sectional rear view illustrating a heat chamber.

On the other hand, as also shown in FIG. 2, an outlet part 29 of the upstream side gas pipe 25 is connected to the heat chamber 24. In a right and upper end part of the heat chamber 24, an introduction port 30 that introduces blow-by gas into the heat chamber 24 is provided, and the outlet part 29 of the upstream side gas pipe 25 is connected to the introduction port 30.

Also, an inlet part 31 of the downstream side gas pipe 26 is connected to the heat chamber 24. In a left and upper end part of the heat chamber 24, a discharge port 32 that discharges blow-by gas from the heat chamber 24 is provided, and the inlet part 31 of the downstream side gas pipe 26 is connected to the discharge port 32.

On the other hand, as shown in FIG. 1, the downstream side gas pipe 26 passes through the left side of the flywheel housing 10 and extends downward as it goes downstream. Further, an outlet part 33 of the downstream side gas pipe 26 is disposed at the height position of the lower end part of the engine 1, and is released to the atmosphere in a state where the outlet part 33 faces downward. As a result, it is possible to prevent the engine from being contaminated by blow-by gas discharged from the outlet part 33. The outlet part 33 of the downstream side gas pipe 26 is the outlet part of the gas pipe 23. Therefore, the gas pipe 23 is extended to the height position of the lower end part of the engine 1.

The heat chamber 24 is provided inside the flywheel housing 10 and in an upper end part of the flywheel housing 10. The heat chamber 24 is mainly defined by a hollow space 40 provided in the flywheel housing 10 and opened toward the front side, and the lid 41 closing a front end opening of the hollow space 40. The flywheel housing 10 is cast in aluminum or iron, and the lid 41 is formed of an arbitrary metal plate. However, it is preferable that the material of the lid 41 should be a material excellent at heat resistance and corrosion resistance and having relatively high thermal conductivity, for example, aluminum or stainless. The lid 41 is superimposed on a lid mounting surface 42 of the flywheel housing 10 positioned around the front end opening of the hollow space 40, and is fixed detachably and airtightly by a plurality of bolts 43.

As shown in FIG. 2, the heat chamber 24 of the present embodiment has a fan shape or a substantial fan shape extending around the central axis C1 of the crankshaft in a rear view as seen from the rear side (i.e. one end side in the direction of the central axis C1 of the crankshaft). The shape of the lid 41 as seen in a rear view is the same. The introduction port 30 is provided on the right side of the upper end part of the heat chamber 24, and the discharge port 32 is provided on the left side of the upper end pan of the heat chamber 24. The central axes of the introduction port 30 and the discharge port 32 extend substantially along the radial direction from the central axis C1 of the crankshaft.

Inside the heat chamber 24, a partition wall 44 that forms a meandering passage in the heat chamber 24 is provided. The partition wall 44 is integrally provided in the flywheel housing 10. As shown in FIG. 1, the partition wall 44 protrudes from a rear inner wall surface 45 of the heat chamber 24, which is the bottom of the hollow space 40, toward the front side integrally and straightly, and is airtightly in contact with the lid 41, thereby vertically partitioning the space in the heat chamber 24. Further, as shown in FIG. 2, the partition wall 44 extends integrally and in an arc shape rightward from the left inner wall surface 46 of the heat chamber 24, which is one side surface of the hollow space 40, to a position where a predetermined gap 48 is formed between the partition wall 44 and a right inner wall surface 47 of the heat chamber 24, which is the other side surface of the hollow space 40.

An outlet of the introduction port 30 faces the gap 48 and a lower inner wall surface 49 of the heat chamber 24. Therefore, the introduction port 30 is configured to allow blow-by gas discharged from the introduction port 30 to linearly flow into a space 50 below the partition wall 44 through the gap 48 as shown by arrows.

As shown in FIG. 1, the heat chamber 24 and the flywheel chamber 11 are overlapped in the vertical direction, and a lower end part of the heat chamber 24 is disposed on a front side of the upper end part of the flywheel chamber 11. In the lower space 50 of the heat chamber 24, a step 51 protruding toward the front side is provided on the rear inner wall surface 45 of the heat chamber 24. Since the step 51 is provided, it is possible to provide the flywheel chamber 11 having a sufficient size on the rear side behind the rear inner wall surface 45 while making room for the flywheel 8.

The shape of the heat chamber 24 is not limited to the above-mentioned shape, and can be changed to an arbitrary shape. Unlike the present embodiment, the number of partition walls 44 may not be one, and a plurality of partition walls may be provided. If possible, the step 51 may not be provided.

The flow of blow-by gas in the configuration of the present embodiment is as shown by the arrows in FIG. 1 and FIG. 2. Blow-by gas from which oil has been separated by the oil separator 22 flows into the heat chamber 24 through the upstream side gas pipe 25 and the introduction port 30. In the heat chamber 24, as shown in FIG. 2, the blow-by gas discharged from the introduction port 30 enters the lower space 50 linearly and smoothly through the gap 48. The blow-by gas first advances to the left side in the lower space 50, and makes a U-turn to the right side, and rises in the gap 48, and enters an upper space 52 partitioned by the partition wall 44. Then, the blow-by gas advances to the left side in the upper space 52, and is discharged from the discharge port 32 into the downstream side gas pipe 26. Thereafter, the blow-by gas flows through the downstream side gas pipe 26, and is discharged into the outside air (i.e. released into the atmosphere) through the outlet part 33.

As described above, it is possible to make the blow-by gas meander in the heat chamber 24, thereby making the blow-by gas temporally stay.

Relatively high temperature oil in the gear chamber 14 lubricating the gear mechanism 13 is attached to the flywheel housing 10 and the lid 41, so the flywheel housing 10 and the lid 41 are heated by the oil. Therefore, due to this heat, it is possible to heat the blow-by gas in the heat chamber 24 to keep it warm, or at least, it is possible to prevent its temperature from dropping. Therefore, it is possible to prevent generation of condensed water attributable to condensation of moisture contained in the blow-by gas, freezing of condensed water in the gas pipe 23, and blocking of the inside of the gas pipe 23 by freezing. Since the blow-by gas is made meander and stay in the heat chamber 24, a long heating time is secured, and this is advantageous to prevent generation of condensed water and so on.

Especially, as blow-by gas flows to the downstream side in the gas pipe 23 exposed to the outside air, it is likely cooled by the outside air and its temperature decreases. The most remarkable part is the outlet part 33 of the downstream side gas pipe 26 where the temperature of blow-by gas decreases the most. Meanwhile, the outside air including a traveling wind entering the outlet part 33, and in a cold region, for example, the outside air entering the outlet part 33 is also very cold. Under such circumstances, condensed water and freezing are likely to occur in the outlet part 33.

However, according to the configuration of the present embodiment, since blow-by gas can be heated by the heat chamber 24 provided in the middle of the gas pipe 23, the temperature of the blow-by gas that reaches the outlet part 33 is raised, so it is possible to effectively prevent generation and freezing of condensed water in the outlet part 33.

Also, according to the configuration of the present embodiment, since the heat chamber 24 is formed by the hollow space 40 integrally provided in the flywheel housing 10 and the lid 41 closing the hollow space 40, it is possible to easily form the heat chamber as compared to a case where a heat chamber which is a completely closed space is formed in the flywheel housing. Also, since the lid 41 is detachable, it is possible to remove the lid 41 to inspect and maintain the inside of the heat chamber 24 if necessary. Also, the lid 41 can be regarded as a part of the separated flywheel housing 10.

However, the heat chamber which is the completely closed space may be formed in the flywheel housing.

The embodiments of the present disclosure have been described above in detail. However, other embodiments of the present disclosure also are possible.

(1) For example, the positions of the introduction port 30 and the discharge port 32 may be reversed or changed.

(2) The partition wall 44 may be long vertically, not horizontally, unlike the present embodiment.

(3) A part or the whole of the gas pipe 23 may be formed of a material other than the metal, for example, rubber or the like.

Embodiments of the present disclosure are not limited to the above-described embodiments, and all modifications, applications, and equivalents encompassed within the idea of the present disclosure defined by claims are also included in the present disclosure. Therefore, the present disclosure should not be interpreted in a limited manner, and can also be applied to other arbitrary technologies belonging to the range of the idea of the present disclosure.

This application is based on Japanese Patent Application (Japanese Patent Application No. 2018-182121) filed on Sep. 27, 2018, the contents of which are incorporated herein by reference.

INDUSTRIAL APPLICABILITY

According to the present disclosure, it is possible to prevent freezing of condensed water in a blow-by gas pipe.

REFERENCE SIGNS LIST

1 Internal Combustion Engine (Engine)
10 Flywheel Housing
13 Gear Mechanism
14 Gear Chamber
22 Oil Separator
23 Gas Pipe
24 Heat Chamber
27 Inlet Part
33 Outlet part

The invention claimed is:

1. A blow-by gas discharge device comprising: a blow-by gas pipe that extends from a height position of an upper end part of an internal combustion engine to a height position of a lower end pail of the internal combustion engine, the blow-by gas pipe being exposed to an outside air and having an outlet part released to an atmosphere: a heat chamber provided in a middle of the blow-by gas pipe and in a flywheel housing of the internal combustion engine, the heat chamber being configured to heat blow-by gas, wherein a partition wall that forms a meandering passage is provided inside the heat chamber, and wherein the internal combustion engine includes: a power transmission mechanism configured to transmit power from a crankshaft to a camshaft: and a mechanism chamber that accommodates the power transmission mechanism, and wherein the heat chamber is adjacent to the mechanism chamber.

2. The blow-by gas discharge device according to claim 1, further comprising:
an oil separator provided at the height position of the upper end part of the internal combustion engine and configured to separate oil from the blow-by gas,
wherein the blow-by gas pipe has an inlet part connected to the oil separator.

3. The blow-by gas discharge device according to claim 1, wherein at least a part of the blow-by gas pipe is formed of a metal.

* * * * *